Aug. 19, 1969   A. A. FRASCA   3,461,992
HYDRAULIC ROTARY POWER TRANSFER MECHANISM
Filed Oct. 12, 1967   3 Sheets-Sheet 1
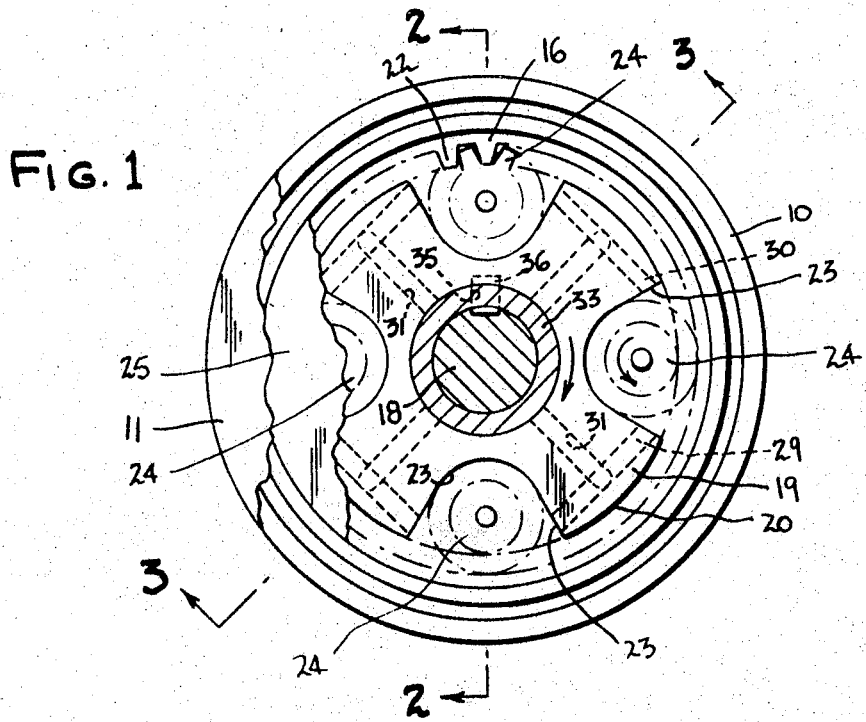
Fig. 1
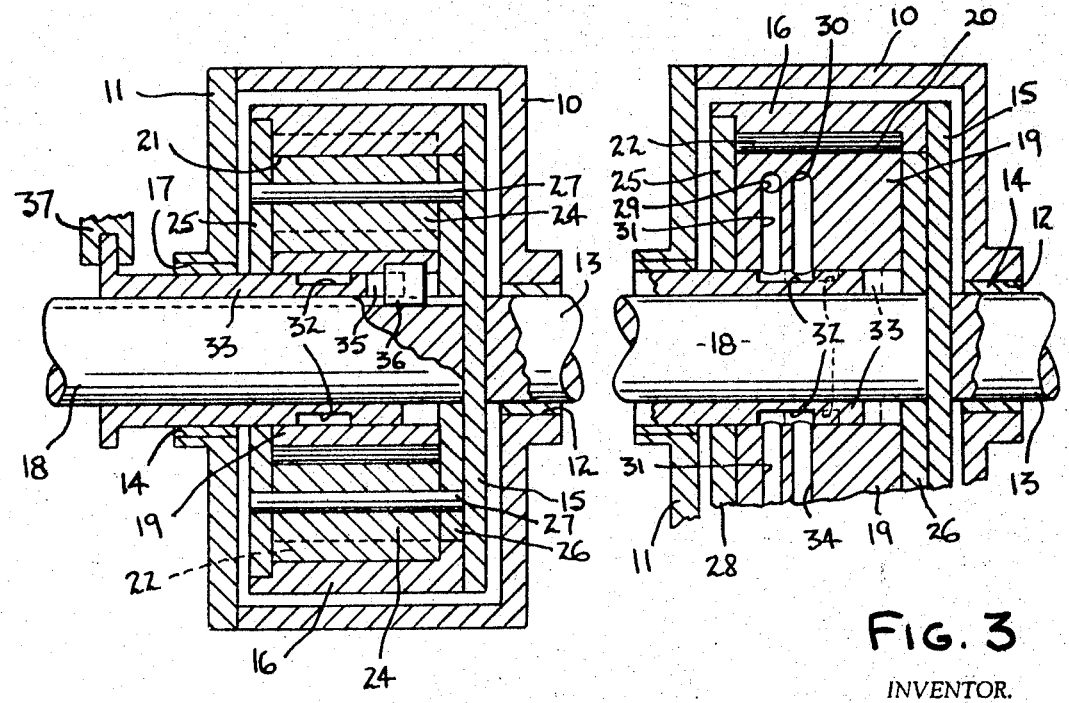
Fig. 2
Fig. 3
INVENTOR.
ARNOLD A. FRASCA
BY
ATTORNEYS.

Aug. 19, 1969    A. A. FRASCA    3,461,992
HYDRAULIC ROTARY POWER TRANSFER MECHANISM
Filed Oct. 12, 1967    3 Sheets-Sheet 3

INVENTOR.
ARNOLD A. FRASCA
BY
ATTORNEYS.

United States Patent Office 3,461,992
Patented Aug. 19, 1969

3,461,992
HYDRAULIC ROTARY POWER TRANSFER MECHANISM
Arnold A. Frasca, 5801 Yorktown Road, Lorain, Ohio 44053
Filed Oct. 12, 1967, Ser. No. 674,927
Int. Cl. F16d 31/02, 31/04
U.S. Cl. 192—60          4 Claims

ABSTRACT OF THE DISCLOSURE

A powered or driving shaft revolves an armature or rotor within a casing containing hydraulic fluid. Movable elements are mounted on the rotor and cooperate with the casing, as the rotor revolves, to displace the hydraulic fluid through a defined circulatory path from the pressure side of an element to the opposite side thereof. Metering means in the circulatory path serve to restrict the volumetric circulation to any desired extent, thus artificially loading the revolving rotor and establishing a fluid coupling between the rotor and the casing in reaction to the artificial loading. The casing is free to rotate and is connected to an output shaft. The reaction force will cause rotation of the casing and its shaft at a speed or angular velocity which is related to the speed of the rotor, the degree of restriction imposed upon the circulation of the hydraulic fluid and the load imposed upon the output shaft. The device, in association with other mechanisms, may be utilized as a power transfer mechanism or torque converter, as a clutch, or as a braking device.

---

The present invention relates broadly to power transfer mechanisms and has as its primary object the provision of a simplified mechanism of this character, which utilizes artificial hydraulic loading to control speed and power transfer between a driving rotary member and a driven or power output member.

Other objects and advantages of my invention will become apparent during the course of the following description.

In the drawings, in which like reference numerals designate like parts throughout the same, FIG. 1 is a plan view of a hydraulic power transfer mechanism embodying the features of my invention, portions thereof being broken away to show detail.

FIG. 2 is a cross-sectional view of the mechanism of FIG. 1, taken as indicated on line 2—2 of FIG. 1.

FIG. 3 is a fragmentary cross-sectional view, taken as indicated on line 3—3 of FIG. 1, and showing a portion of the circulatory path for the fluid and metering control means.

Figure 4:
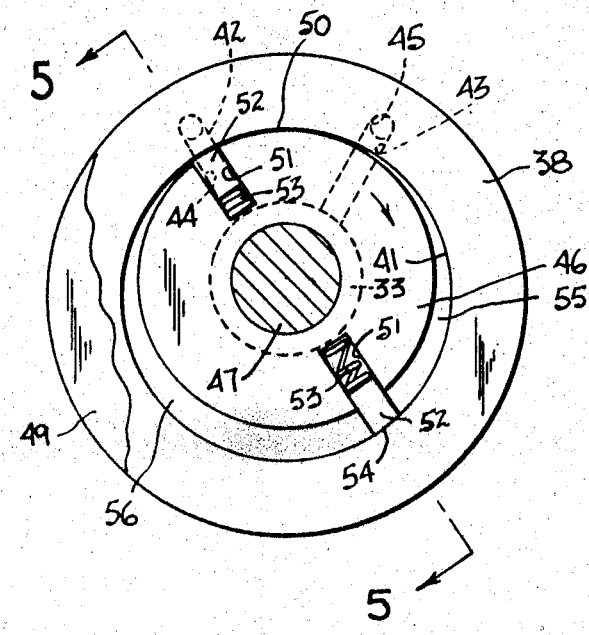
FIG. 4 is a plan view, similar to FIG. 1, of a modified form of power transfer mechanism embodying the principles of my invention, portions thereof being broken away to show detail.

Referring more particularly to FIGS. 1, 2 and 3 of the drawings, I have shown an enclosure or housing 10 having a removable cover 11. The body of the housing 10 is provided with a central opening 12 in which a shaft 13 is rotatably journalled. Suitable bearing or sealing elements, such as the seal 14, can be provided on the shaft. Internally of the housing 10, the shaft 13 is secured to a support member 15 which is rigidly attached to or integral with an internal ring gear 16. The elements 13, 15 and 16 are free to rotate as a unit within the housing 10.

The housing cover 11 is provided with an opening 17, in coaxial alignment with the opening 12, in which a shaft 18 is journalled for rotation, said shaft also carrying a suitable seal 14. The shaft 18 is secured to the hub of a rotor 19 of cylindrical form, whose circumference or peripheral surface 20 has close or wiping engagement with the internal peripheral surface 21 defined by the ends of the teeth 22 of the ring gear 16. The rotor 19 is provided with a plurality of uniformly circumferentially spaced peripheral recesses 23 which are adapted to accommodate closely the movable pressure elements which, in this form of the invention, are shown as spur gears 24.

A pair of spaced cage plates 25, 26 are secured to the opposite faces of the rotor 19 and are provided with circumferentially spaced axles 27, on each of which a spur gear 24 is rotatably mounted. The rotor 19, the gears 24 and the cage plates 25 and 26 provide a cage assembly 28 which can rotate as a unit relatively to the ring gear 16, with the rims of the cage plates 25 and 26 being disposed closely adjacent to the ring gear 16 to substantially seal the space defined between the opposed faces of the cage plates 25 and 26.

Each of the recesses 23 is provided, on opposite sides of the open end thereof, with a fluid port 29 and a fluid port 30. The port 29 communicates with a passageway 31 which extends within the body of the rotor 19 toward the shaft 18 where it communicates with a peripheral recess 32 which is provided on the surface of a metering sleeve 33 which is slidably mounted on the shaft 18. Similarly, the fluid port 30, which is disposed on the opposite side of the recess 23, communicates with a fluid passageway or channel 34 which, in turn, communicates with the control sleeve recess 32 in longitudinally spaced relationship to the passageway 31. The sleeve 33 may be provided with a longitudinal slot 35 to provide clearance for a key 36 which may be used for effecting securement of the shaft 18 to the rotor 19. The reference character 37 designates a link or other suitable element connected to an external portion of the sleeve 33, by means of which and in association with any suitable actuating means or sensing means, either manual or automatic, the sleeve 33 can be positioned and retained at a desired metering position relatively to the passageways 31 and 34.

Either the shaft 13 or the shaft 18 may be utilized as the powered or driving shaft, but for purposes of this description, the shaft 18 will be considered as being attached to a rotary power source for driving the shaft, and the shaft 13 will be considered connected to the load to which the rotary power is to be transmitted. With the cage assembly 28 and the housing 10 filled with hydraulic fluid, and the shaft 18 being rotated in the clockwise direction indicated by the arrow on FIG. 1, the entire cage assembly will be caused to rotate in said clockwise direction relatively to the ring gear 16. This rotary motion of the cage assembly causes each of the spur gears 24 to rotate in a counterclockwise direction about its axle 27, as indicated by the arrow in FIG. 1, in response to the interengagement of the spur gear with the teeth of the ring gear. The teeth of the spur gear are closely confined by the recess 23 so that each gear 24 acts to displace the hydraulic fluid in the recess 23 and force it under pressure into the fluid port 29. If the circulation of the fluid is not restricted, it will flow freely through the passageway 31, through the connecting recess 32 in the sleeve 33, through the fluid passageway 34 and out through fluid port 30 to the opposite side of an adjacent recess 23. During this circulatory movement of the fluid, very little load is impressed upon the gears 24 and the entire rotary movement of the cage assembly 28 is devoted to circulating the hydraulic fluid with no effect upon the ring gear 16. Under these circumstances, the illustrated position of the sleeve 33 may be considered as the idle or neutral position of the mechanism.

If the sleeve 33 is slidably moved to a position where it partially or completely blocks the flow of fluid through the passageway 31, as for example the position shown in phantom outline in FIG. 3, the circulatory flow of fluid will be restricted and pressure will be built up in the recess 23 adjacent to the fluid port 29. Consequently, a hydraulic load is impressed upon the gears 24 and they are artificially restrained from freely rotating about their own axes as the cage assembly 28 continues its movement. Therefore, a portion of the rotary movement of the cage assembly will be translated into rotary movement of the ring gear 16 in the same clockwise direction. The equilibrium between the artificial hydraulic loading of the gears 24 and the load on the ring gear shaft 13 will determine the proportionate reduced speed rotation of the ring gear at any selected metering position of the control sleeve 33. If, by completely blocking the circulatory flow of the hydraulic fluid, the gears 24 are artificially loaded to a point where they are incapable of any axial rotation, the angular velocity of the cage assembly 28 will be transferred entirely into like angular velocity of the ring gear 16. Thus, by suitable control of the position of the sleeve 33, a degree of circulatory restriction can be imposed to obtain any desired speed control ratio within the range of 1:1 down to 1:0.

It will be noted that, if variable speed control is not required in the particular application in which the power transfer mechanism is utilized, or if an inherent speed control limit is desired, the size of the circulatory passageways can be fixed to provide an inherent restriction on circulatory flow of the hydraulic fluid when the speed of rotation of the cage assembly 28 exceeds a predetermined limit. In this manner, the power transfer mechanism can also be utilized as a hydraulic clutch mechanism or, if the ring gear is retained against movement, the mechanism could be utilized as a braking device for the shaft 18.

Although the mechanism has been described with the fluid displacing gears 24 engaging an internal ring gear 16, it will be apparent that the mechanism will operate in essentially the same manner if a central sun gear of the spur type is used instead of the ring gear.

Figure 5:
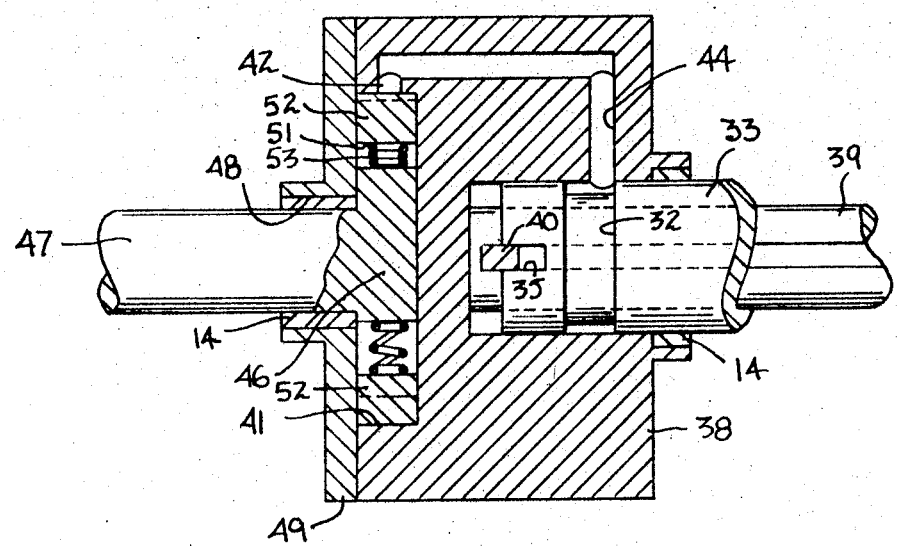
FIG. 5 is a cross-sectional view taken as indicated on line 5—5 of FIG. 4.

Referring now to FIGS. 4 and 5 of the drawings, I have shown a modified form of the invention in which the movable elements associated with the rotor are in the form of slidably mounted blades having wiping engagement with a cylindrical surface forming part of the driven portion of the mechanism. In this form of the mechanism, a cylindrical casing 38 is provided and has an eccentrically mounted shaft 39 secured thereto by suitable means such as the key 40. The slotted control sleeve 33 is slidably mounted on the shaft 39 and is provided with the annular recess 32 for metering the circulatory flow of hydraulic fluid in the mechanism.

The casing 38 is provided with a cylindrical inner surface 41 having a pair of circumferentially spaced fluid ports 42 and 43 provided therein. The ports may be approximately 60° apart. The port 42 communicates with a passageway 44 which extends within the casing 38 to communication with the recess 32 of the sleeve 33. Another passageway 45 within the casing 38 provides communication between the recess 32 and the fluid port 43. A cylindrical rotor 46 is coaxially secured to the driving shaft 47, which shaft is journalled in coaxial alignment with the shaft 39 in an opening 48 which is provided in a cover plate 49 which closes the open end of the casing 38. A suitable oil seal 14 is provided on the shaft 47.

The rotor body 46 is so mounted on the shaft 47 as to have a wiping contact with the cylindrical surface 41, as at 50. The contact point 50 is approximately midway between the two fluid ports 42 and 43 which are provided in the casing 38. A blade 52 is slidably mounted in each of two diametrically opposed cavities 51 provided in the rotor 46 and is biased by a spring 53 to maintain the wiping surface 54 of the end of the blade in contact with the surface 41 of the casing.

With the mechanism filled with hydraulic fluid and the driving shaft 47 being rotated in a clockwise direction, as indicated by the arrow on FIG. 4, the blades 52 will each alternately define an expanding fluid chamber, such as indicated at 55, and a contracting fluid chamber, such as indicated at 56. When the hydraulic fluid can freely circulate between the ports 42 and 43, the effect of rotation of the rotor is merely to force the hydraulic fluid from the contracting chamber 56 through the port 42, through passageway 44 and recess 32, into passageway 45 and out through port 43 where the fluid enters the expanding chamber 55. This movement of the rotor does not effect any movement of the casing as there is no appreciable load on the blade 52.

However, if the control sleeve 33 is adjusted to restrict or completely block the free circulation of the hydraulic fluid between the ports 42 and 43, a pressure buildup occurs in the contracting chamber 56 which causes rotation of the casing 38 and its shaft 39 in some proportion or ratio to the rotation of the rotor 46, as determined by the equilibrium of forces and loads involved. By selective positioning of the control sleeve 33, desired speed ratios can be obtained in the range of 1:1 ratios or less, as previously described.

Figure 6:
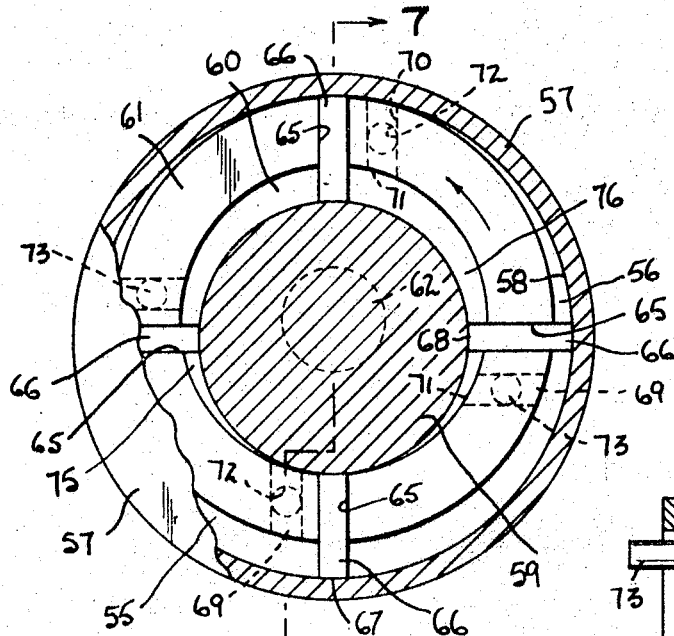
FIG. 6 is a plan view, similar to FIG. 4, but showing a further modification of the invention.
Figure 7:
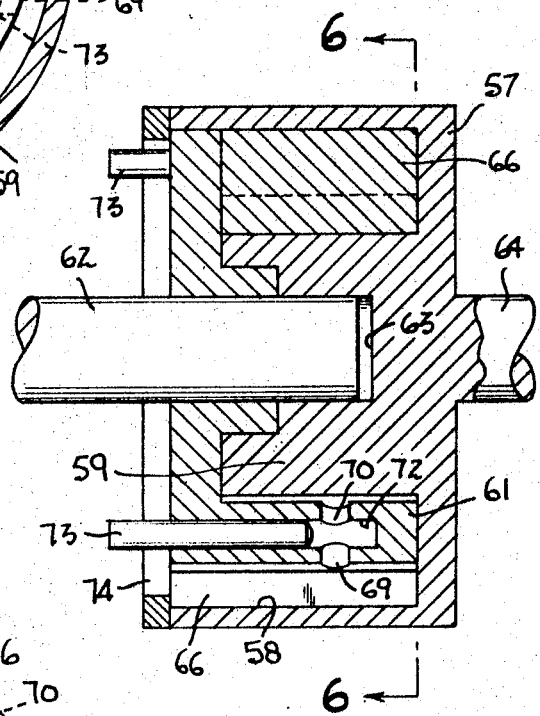
FIG. 7 is a cross-sectional view taken as indicated on line 7—7 of FIG. 6.

Referring now to FIGS. 6 and 7 of the drawings, I have shown a modified form of the blade-type mechanism in which the springs 53 are eliminated in favor of positive camming of the blades into engagement with the cylindrical surface of the casing. Furthermore, by rearranging the porting of the fluid chambers defined by the blades, the blade-engaging cam surface serves the additional function of defining a second set of fluid chambers so that a double-action effect is obtained from the blades.

In this modified form of the invention, a casing 57 is provided with an internal cylindrical surface 58 and a central cam hub 59 defining an annular space 60 within the casing. An annulus rotor 61 is accommodated in the space 60 and is secured to a driving shaft 62 which is coaxial therewith and extends into a journal bore 63 in the cam hub 59. A driven shaft 64 is secured to the casing 57 in coaxial alignment with the shaft 62, but the shaft 62 is mounted eccentric to the axis of the casing 57 so as to cause the rotor 61 to have an eccentric movement relatively to the cylindrical surface 58 of the casing.

The rotor 61 is provided with a plurality of radially extending uniformly spaced bores 65, each of which is adapted to slidably receive a blade 66 which traverses this portion of the rotor and whose outer end 67 has wiping engagement with the cylindrical surface 58, and whose innner end 68 has wiping engagement with the surface of the cam hub 59.

A fluid port 69 is provided on the outer rim of the rotor 61 between each pair of blades, and communicates through a passageway 70 with a fluid port 71 provided on the inner rim of the rotor 61. An axially extending bore 72 in the rotor intersects the passageway 70 and slidably accommodates a metering rod 73, which can be selectively positioned so that its end restricts or blocks the flow of fluid through the passageway 70.

A cover ring 74 is secured to the casing 57 to retain the rotor assembly in position within the casing. Any suitable linkage or means can be used to connect the exposed ends of the metering rods 73 for uniform actuation in response to manual or automatic control.

With the casing 57 filled with hydraulic fluid and the rotor shaft 62 driving in the counter-clockwise direction indicated by the arrow on FIG. 6, the blades 66 will sequentially form expanding fluid chambers 55 and contracting fluid chambers 56, as previously described, between the outer rim of the rotor and the cylindrical surface 58 due to the eccentric rotation of the rotor relatively to the cylindrical surface 58. However, as these outer fluid chambers are formed during rotation of the rotor, the inwardly projecting ends of the blades 66 form converse chambers between the inner rim of the rotor and the cylindrical surface of the cam hub 59. As the outer end 67 of a given blade forms an expanding chamber 55, its inner end 68 is forming a contracting chamber, such as 75, and conversely when the outer end of the blade is forming a contracting chamber 56, the inner end of that blade is forming an expanding chamber 76.

When the flow of the hydraulic fluid between the ports 69 and 71 is not restricted, the eccentric rotation of the rotor 61 circulates the fluid between the ports 69 and 71 with no effect upon the casing 57. However, when the passageways 70 are restricted or blocked by the metering rods 73, there is a pressure buildup of the fluid in the outer contracting chamber 56, as well as in the inner contracting chamber 75 which creates a rotative reaction of the casing and its shaft 64, in the manner previously described with reference to FIG. 4.

Figure 8:
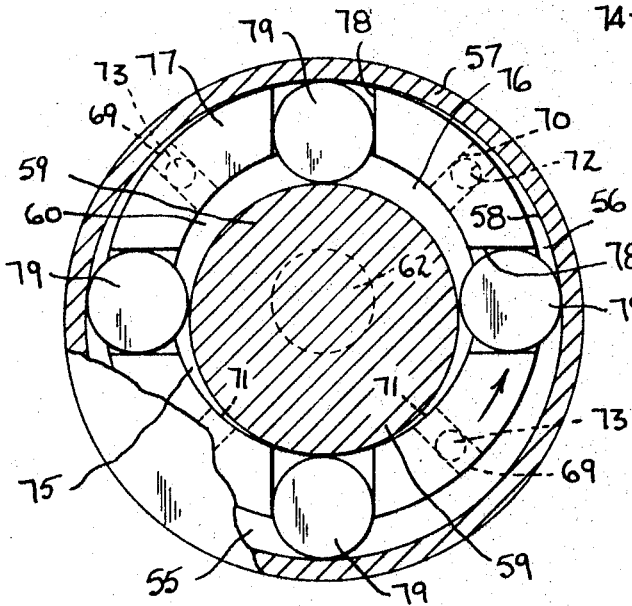
FIG. 8 is a plan view, similar to FIG. 6, showing another modified form of my invention.

The same principle of dual action described above with reference to FIGS. 6 and 7 can also be accomplished by using rollers instead of blades, as illustrated in FIG. 8 of the drawings. In this modified form of the invention, a modified rotor 77 is utilized, having bores or cavities 78 of sufficient size to accommodate rollers 79. In all other respects the power transfer mechanism shown in FIG. 8 is the same as that shown in FIG. 6 and its operation is identical thereto, except that the rollers 79 are utilized instead of the blades 66.

Having thus described my invention, I claim:

1. In a hydraulic power transfer mechanism, the combination of a casing member for hydraulic fluid, said casing member presenting a cylindrical internal surface, a rotor member mounted for eccentric rotation relatively to said cylindrical surface, fluid-displacing means movably mounted on said rotor member for engagement with said casing member and defining fluid-containing chambers on opposite sides of said means, said fluid-displacing means being reciprocably movable relatively to said rotor member in response to said eccentric relative rotation of said members, passageways establishing fluid communication between said chambers, one of said chambers being an outlet compression chamber having a contracting volume in response to relative rotation between said members and the opposite chamber being an inlet chamber having an expanding volume in response to relative rotation between said members, said fluid-displacing means causing circulation of fluid between said chambers in response to relative rotation between said members, a cam surface mounted on said casing member coaxially with said cylindrical surface and biasing said fluid-displacing means into engagement with said cylindrical surface, means for connecting one of said members to a power source to effect driving rotation thereof, means for connecting the other of said members to a load to be driven, and metering means for restricting said fluid circulation between said chambers to artificially load said fluid-displacing means and cause reactive rotation of said driven member in response to rotation of said driving member.

2. A combination as defined in claim 1, wherein said fluid-displacing means comprises a blade element slidably mounted in said rotor member and projectable therefrom into engagement with said cylindrical surface.

3. A combination as defined in claim 1, wherein said fluid-displacing means comprises a roller element slidably and rotatably mounted in said rotor member and projectable therefrom into engagement with said cylindrical surface.

4. A combination as defined in claim 1, wherein said fluid-displacing means defines a supplementary outlet chamber of contracting volume and a supplementary inlet chamber of expanding volume in association with said cam surface, and said passageways establish fluid communication between said supplementary chambers and said first-named chambers.

References Cited

UNITED STATES PATENTS

| 1,186,132 | 6/1916 | Rich | 192—58 |
| 1,906,896 | 5/1933 | Aydt | 192—57 |
| 2,038,613 | 4/1936 | Staats | 192—58 XR |

CARLTON R. CROYLE, Primary Examiner

ALLAN D. HERRMANN, Assistant Examiner

U.S. Cl. X.R.

192—17, 48.1, 61, 72, 103, 104